June 4, 1968

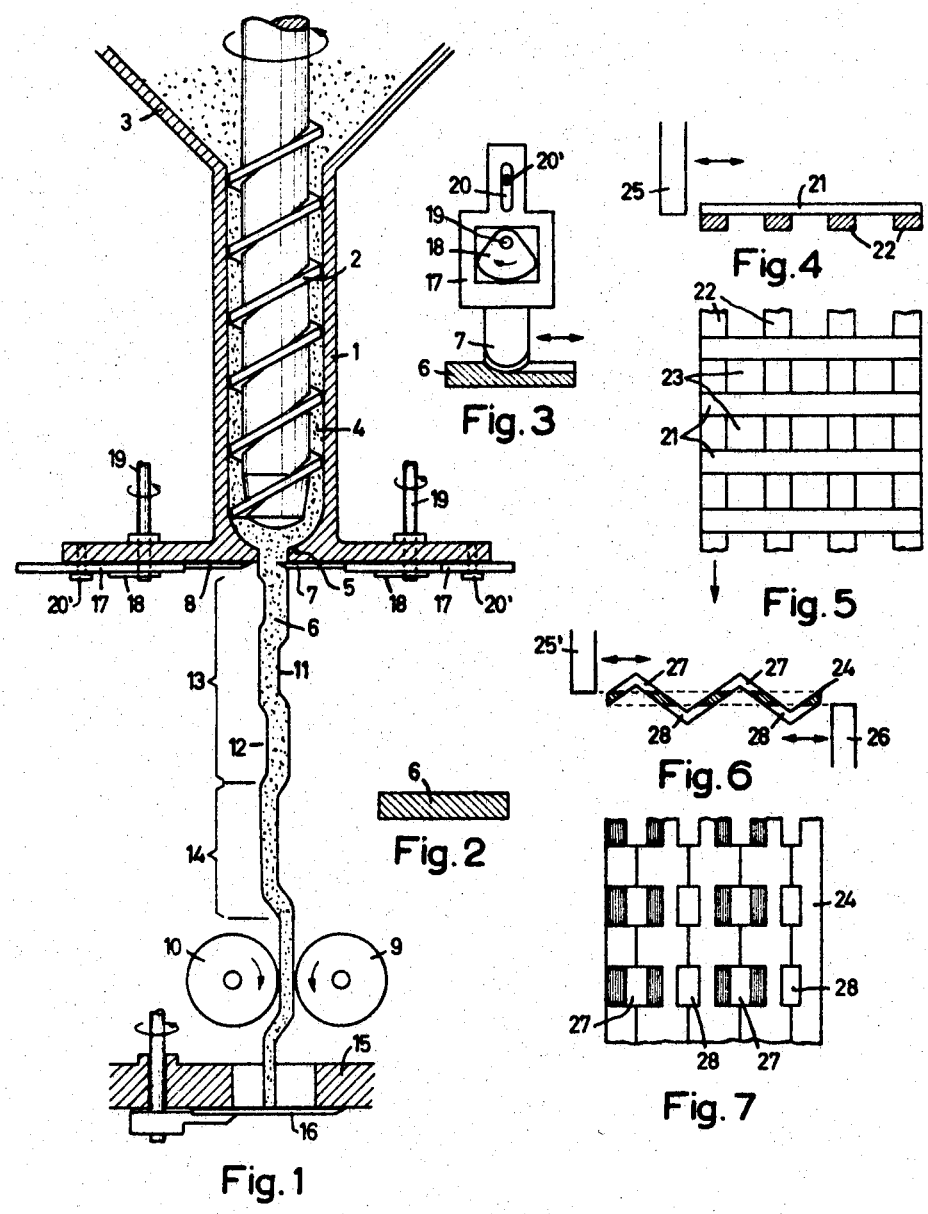

C. STÖHR 3,387,069

METHOD FOR THE MANUFACTURE OF TUBE
PROFILES FROM THERMOPLASTICS

Filed Dec. 16, 1963

INVENTOR.
CHRISTIAN STÖHR

ATTORNEYS

June 4, 1968 C. STÖHR 3,387,069
METHOD FOR THE MANUFACTURE OF TUBE
PROFILES FROM THERMOPLASTICS
Filed Dec. 16, 1963 3 Sheets-Sheet 3
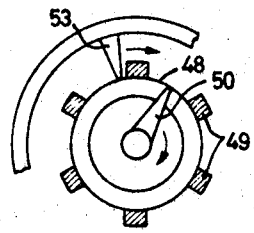
Fig. 14
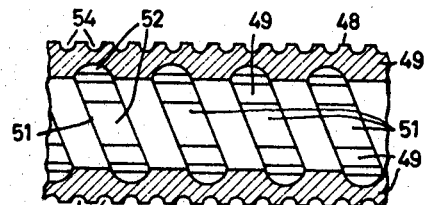
Fig. 15
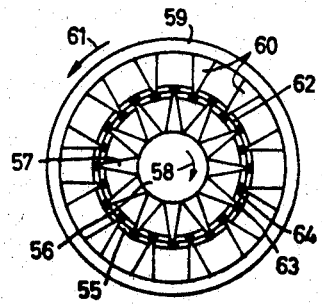
Fig. 16
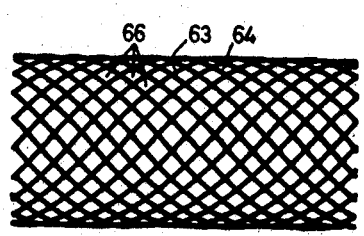
Fig. 17
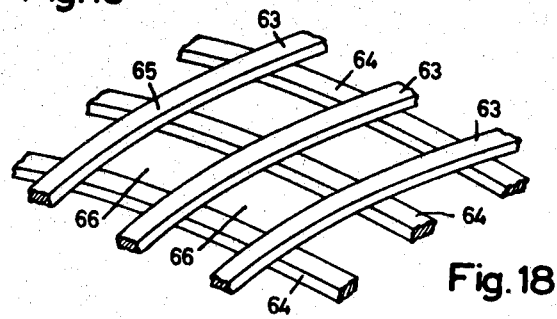
Fig. 18
    
Fig. 19  Fig. 20  Fig. 21  Fig. 22  Fig. 23
 
Fig. 24  Fig. 25
INVENTOR.
CHRISTIAN STÖHR
ATTORNEYS United States Patent Office 3,387,069
Patented June 4, 1968

3,387,069
METHOD FOR THE MANUFACTURE OF TUBE PROFILES FROM THERMOPLASTICS
Christian Stöhr, Zeyern, near Kronach, Germany, assignor to Anita Stöhr, Bazenheid, Switzerland
Filed Dec. 16, 1963, Ser. No. 330,718
Claims priority, application Germany, Dec. 24, 1962, St 20,128
8 Claims. (Cl. 264—145)

A method for producing various profiled and apertured tubes from thermoplastic material by cutting into an extruded form under continuous tension as it issues from an extrusion press while still in the warm plastic state. A smooth tube or form 34, as it issues from the extrusion press, is cut into or carved simultaneously on the inside and outside thereof by means of rotating knives 37 and 38, located respectively outside and inside of the extrusion form. As a result of continuous tension applied, a stretching or expansion of the non-cut portions of the tube takes place. Subsequently, after the extruded form is set, the entire stretched form is cooled to solidify it.

ABSTRACT OF THE DISCLOSURE

The present invention is related to the technique of extruding thermoplastics and has for its object to provide new and improved methods for uncomplicated and economical production of a wide variety of tube profiles.

Figure 8:
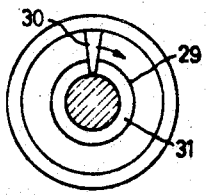

According to the invention, an extruded shape or profile emerging from an extruder is carved or cut through at different spots on one or more sides transverse to the extruding direction, and simultaneously stretched by exerting tension in the extruding direction. The extruded material is subsequently cooled in a conventional manner.

Another important feature of the invention comprises auxiliary cutting means for use on extruders, consisting mainly of one or more revolving or reciprocating blades located inside or outside the extruder head.

The new method is suitable for the manufacture of optionally formed profiles useful for various purposes, e.g. conveyor and transmission belts, sieves, sieve drums, grids, floor covering, door mats, roller blinds, netlike hoses for packing purposes, and many other articles.

If, for instance, a netlike hose is to be produced, a tube is cut by several blades arranged in two blade rings, which revolve in opposite directions.

For a thorough understanding of the invention and how it is to be carried into effect, it will now be explained in detail with reference to the accompanying drawings, in which FIGS. 1–7 refer to the production of grid or net structures;
FIGS. 8–15 show various possibilities for the production of profiled rods;
FIGS. 16–18 show the production of a netlike hose;
FIGS. 19–25 show several profiles useful for the purposes of the invention.

Referring now to FIG. 1, an extruder 1 is shown, which is fed through a funnel 3 with a thermoplastic material 4, e.g. polyethylene. Suitable heating means, not shown, may be provided in a conventional manner. The material is extruded through the die 5 by a screw 2 and emerges from the die with a profile as shown in FIG. 2, for example. Two blades 7 and 8, adapted to reciprocate at the outside of the die 5, carve the strip 6 alternatingly. Drawing rolls 9, 10 are provided to stretch the extruded material while still in its plastic state, which results in growing of the staggered alternate cuts into wide transverse grooves 11 and 12 on both sides. The stretching takes place within the zone 13. The material is then passed through a cooling zone 14 which may comprise a water bath, not shown.

After the drawing rolls, there is arranged a guide jack 15 bearing a rotating knife 16, which cuts the extruded strip 6 to the desired lengths.

FIG. 3 shows schematically the driving mechanism for the reciprocating blades 7 and 8. Each blade is mounted on a guide frame 17, respectively, which is actuated by a cam disc 18 mounted on a shaft 19 for external drive. Each frame is swinging around a guide pin 20' projecting into a slotted hole 20.

Manufacture of a lattice structure, substantially similar to that shown in FIG. 1, will be explained with reference to FIGS. 4 and 5. The extruder die produces a strip 21 with longitudinal ribs or fins 22. A single reciprocating blade 25 cuts through the strip 21 transversely, while the ribs remain uncut. Due to the cutting and stretching, which can here also be effected by suitable drawing rolls, holes 23 are developed in the strip 21, thus forming a lattice web useful for various purposes as door mats, floor covering, blinds, etc.

FIGS. 6 and 7 are a front and top view, respectively, of a zigzag web 24 emerging from a correspondingly shaped die in the extruder head. The edges 27 and 28 on top and bottom side are cut by transversely reciprocating blades 25 and 26 to produce a lattice structure. Stretching and cooling are performed in a manner similar to that described in connection with FIG. 1.

If the profiles are to have cuts or openings precisely at right angles to the emerging direction, it is necessary to somewhat incline the front surface of the extruder die and to arrange the cutting blades accordingly. Thus the relative speeds of the extruded material and the blades can be taken into account.

Figure 9:
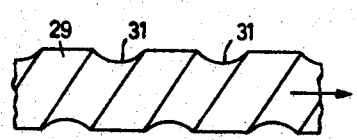

FIGS. 8 and 9 illustrate schematically the manufacture of a profile rod 29. While emerging from a die with a circular profile, the extruded form 29 is carved by an external revolving blade 30, which results in helical grooves 31 after the stretching operation.

Figure 10:
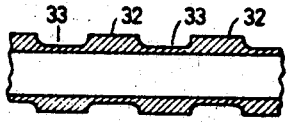

FIG. 10 shows a tubular profile 32 which has been provided with helical grooves 33 in a similar way by carving with a revolving blade and simultaneously stretching.

Figure 11:
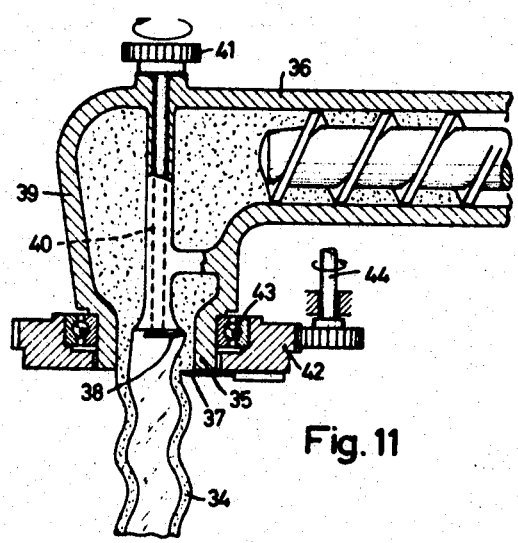

The manufacture of a tube 34 corrugated on the in- and out-side is shown in FIG. 11. Revolving blades 37, 38 are arranged on and withi nthe die 35 of the extruder 36. The tube, having originally an annular cross-section, is carved staggered and alternately on both sides. This and the simultaneous stretching operation will produce helical corrugations or furrows. Such tubes or hoses, if made of an appropriate plastic material, are easily flexible and extremely well suited as insulating tubes and vacuum cleaner hoses. The blade 38 is secured to a shaft 40 rotatably mounted in the extruder head 39 and driven by a gear wheel 41. The blade 37 is mounted on a gear wheel 42 fitted to the outside of the die 35 by means of a ball bearing 43 and driven by a rotating shaft 44.

Figure 12:
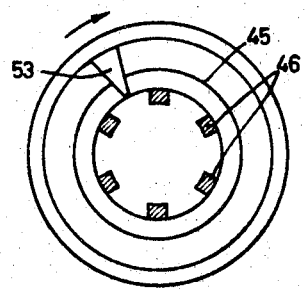
Figure 13:
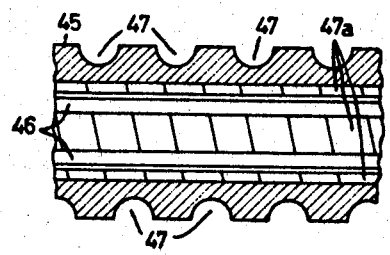

FIGS. 12 and 13 refer to the manufacture of tubes 45 with longitudinal ribs or fins 46 on the inside. A suitable tube profile 45 is extruded from the extruder shown in FIG. 11 and cut transversely by a revolving blade 53 down to the level of the ribs. The simultaneous stretching operation, being also performed in this case, produces helical grooves 47 which transmute into corresponding openings or holes 47a between the ribs 46.

Another tubular profile, produced in a similar manner, is shown in FIGS. 14 and 15. Longitudinal ribs or fins 49 are arranged adjacent to and spaced from each other in a radial direction relative to the extrusion direction on the outside of a tube 48, which is cut by an inner revolving blade 50 as far as the level of the ribs. Due to the stretching, helical grooves are formed on the inside of the tube, while only the ribs 49 remain on the outside. Also in this case, openings or holes 52 develop as already shown in FIGS. 12 and 13.

Additionally, it is possible to carve the ribs 49 by an external revolving blade 53 as shown in FIG. 14, which will produce helical, discontinuous grooves 54. As shown, blades 50 and 53 both rotate about the extrusion axis, as does blade 38 of FIG. 11. In the example shown, the external blade 53 revolves with three times the speed of the internal blade 50. Such tube profiles are useful for sieve drums, network hoses, curling pins and the like.

FIGS. 16, 17 and 18 illustrate the manufacture of a tubular hollow body with network or lattice structure produced by carving a tube by means of two rows of blades revolving in opposite direction. A tube 55, emerging from an extruder as shown in FIG. 11, is carved or cut at longitudinally spaced locations along the form by twelve blades 57 arranged in equal distances on a blade hub 56 revolving clockwise (see arrow 58) within the extruder die. The remainder of the tube wall, of about half the original thickness, is carved from the outside by twelve other blades 60, which are secured to a blade ring 59 rotatably mounted on the outside of the extruder die, for example. This ring revolves counterclockwise, see arrow 61, and is axially shifted relative to the blade hub. By carving to approximately the same diameter from both sides alternately, a plurality of staggered external and internal ribs 63 and 64 are formed as shown in the side view (FIG. 17) of the finished product. For reliably cutting the material that tends to evade the blade pressure, the blade tips of both sets 57 and 60 are designed with a radial overlap. Also in this case, the material is stretched, which results in the formation of a plurality of separate openings 66 at the cutting or crossing spots and thus in a network structure.

The invention is applicable to various profiles. For example, besides the profiles already mentioned, it is possible to use square, triangular, semicircular, arc, T, U, and star profiles as shown in FIGS. 19 to 25. These profiles are also carved and stretched to produce grooves or openings. To increase the tensile strength, threads or wires 67 (FIG. 23) made of a properly stretchable material such as plastic or metal may be worked into the extruded form.

For applications requiring exceptional strength, another stretching operation may be performed after the cooling.

What I claim is:

1. A method for the production of various profiled and apertured tubes from thermoplastic material by cutting into an extruded form issuing from an extrusion press, characterized by the steps of: pressing an extruded form out of an extrusion die, applying continuous tension to said extruded form as it issues from the die while cutting into said extruded form inside and outside thereof at a location near the die and in a direction transverse to the extruding direction while the form is still warm and in a plastic state, applying said continuous tension in such manner as to effect a mutual stretching movement of the uncut portions of said form, and subsequently cooling the entire stretched form to solidify same.

2. A method according to claim 1 at least part of said cutting step being performed at a location immediately outside the extrusion die as the extruded form issues therefrom.

3. A method according to claim 1, said cutting step of the extruded form being performed so as to cut through the form at locations along the form spaced in the extruding direction.

4. A method according to claim 1, said cutting of the extruded form being performed so as to cut through the form at longitudinally spaced locations along the form.

5. A method according to claim 1, said form being tubular, said cutting of the extruded form being performed so as to cut into the tube inwardly and outwardly at staggered alternatively longitudinally spaced locations along the form.

6. A method according to claim 1, said extruded form issuing from the die as a tube defining an extrusion axis and having longitudinal ribs adjacent to and spaced from each other in a radial direction relative to the extrusion direction, said cutting being performed in a rotational direction transverse to the extrusion axis so as to cut said form transversely while said ribs remain uncut.

7. A method according to claim 6, said cutting being performed so as to cut the tube alternately on the inside and outside thereof to thereby produce a lattice structure.

8. A method according to claim 1, said extruded form issuing from the die being shaped as a tubular hollow body, said cutting step comprising carving into said body at a plurality of locations in counter-rotational directions transverse to the extrusion direction and inwardly and outwardly of said body so as to form a plurality of openings through the form at the cut locations and a plurality of internal and external ribs.

References Cited

UNITED STATES PATENTS

| | | | |
|---|---|---|---|
| 2,361,369 | 10/1944 | Grebe et al. | |
| 2,597,975 | 5/1952 | Colombo | 264—145 |
| 2,793,598 | 5/1957 | Rivoche | 107—14.4 |
| 3,086,246 | 4/1963 | Stone | 264—145 |

FOREIGN PATENTS

| | | |
|---|---|---|
| 621,835 | 12/1962 | Belgium. |
| 110,583 | 2/1961 | Pakistan. |

ROBERT F. WHITE, *Primary Examiner.*

S. I. LANDSMAN, *Assistant Examiner.*